US010868683B2

(12) United States Patent
Bozionek et al.

(10) Patent No.: US 10,868,683 B2
(45) Date of Patent: *Dec. 15, 2020

(54) METHOD AND CONFERENCE SERVER FOR INITIALIZING SCHEDULED CONFERENCES

(71) Applicant: Unify GmbH & Co. KG, Munich (DE)

(72) Inventors: Bruno Bozionek, Borchen (DE); Karl Klaghofer, Munich (DE)

(73) Assignee: Unify GmbH & Co. KG, Munich (DE)

( * ) Notice: Subject to any disclaimer, the term of this patent is extended or adjusted under 35 U.S.C. 154(b) by 213 days.

This patent is subject to a terminal disclaimer.

(21) Appl. No.: 16/001,158

(22) Filed: Jun. 6, 2018

(65) Prior Publication Data
US 2018/0323987 A1    Nov. 8, 2018

Related U.S. Application Data

(63) Continuation of application No. 14/947,207, filed on Nov. 20, 2015, now Pat. No. 10,020,950, which is a
(Continued)

(30) Foreign Application Priority Data

Jun. 30, 2005    (DE) .................. 10 2005 030 597

(51) Int. Cl.
*H04L 12/18*    (2006.01)
*H04L 1/00*    (2006.01)
*H04M 3/56*    (2006.01)
*H04L 29/08*    (2006.01)
*H04L 29/06*    (2006.01)
(Continued)

(52) U.S. Cl.
CPC ........ *H04L 12/1818* (2013.01); *H04L 1/0029* (2013.01); *H04L 65/1069* (2013.01); *H04L 65/403* (2013.01); *H04L 67/18* (2013.01); *H04M 3/56* (2013.01); *H04L 1/0003* (2013.01); *H04L 1/0009* (2013.01); *H04L 1/0073* (2013.01); *H04L 27/2601* (2013.01); *H04M 3/42374* (2013.01); *H04M 3/565* (2013.01); *H04M 2203/5063* (2013.01); *H04M 2242/30* (2013.01); *H04W 52/246* (2013.01)

(58) Field of Classification Search
None
See application file for complete search history.

(56) References Cited

U.S. PATENT DOCUMENTS 6,275,575 B1    8/2001  Wu
7,461,126 B2    12/2008 Berkeland et al.
(Continued)

FOREIGN PATENT DOCUMENTS

JP    2003288432 A    10/2003
WO    2004114662 A1    12/2004

*Primary Examiner* — Ryan F Pitaro
(74) *Attorney, Agent, or Firm* — Buchanan Ingersoll & Rooney PC

(57) ABSTRACT

Conference participants are selected via a network element in a network, the geographical area locations, for example, buildings of an enterprise, of the conference participants are determined and depending on the determined locations a geographical conference area, for example a conference room is determined for each conference participant. The conference area together with the conference information is communicated to the conference participants. The availability of the conference participants can be checked for the communication.

17 Claims, 1 Drawing Sheet

Related U.S. Application Data continuation of application No. 11/922,663, filed as application No. PCT/EP2006/063599 on Jun. 27, 2006, now Pat. No. 9,231,775.

(51) Int. Cl.
| | |
|---|---|
| *H04L 27/26* | (2006.01) |
| *H04M 3/42* | (2006.01) |
| *H04W 52/24* | (2009.01) |

(56) References Cited

U.S. PATENT DOCUMENTS

| | | |
|---|---|---|
| 2002/0147777 A1 | 10/2002 | Hackbarth et al. |
| 2002/0152205 A1 | 10/2002 | Hodam et al. |
| 2002/0152273 A1 | 10/2002 | Pradhan et al. |
| 2002/0184063 A1 | 12/2002 | Kaufman et al. |
| 2003/0005055 A1 | 1/2003 | Ralston et al. |
| 2005/0243165 A1 | 11/2005 | Endler et al. |
| 2006/0062367 A1 | 3/2006 | Christenson et al. |
| 2006/0177034 A1 | 8/2006 | Reding |
| 2007/0282661 A1 | 12/2007 | Franco |
| 2008/0133282 A1 | 6/2008 | Landar et al. |
| 2008/0162198 A1 | 7/2008 | Jabbour et al. |
| 2009/0017803 A1 | 1/2009 | Brillhart et al. |
| 2009/0077244 A1 | 3/2009 | Trang et al. |
| 2009/0112671 A1 | 4/2009 | Grodum |
| 2010/0198646 A1 | 8/2010 | Mikan et al. |

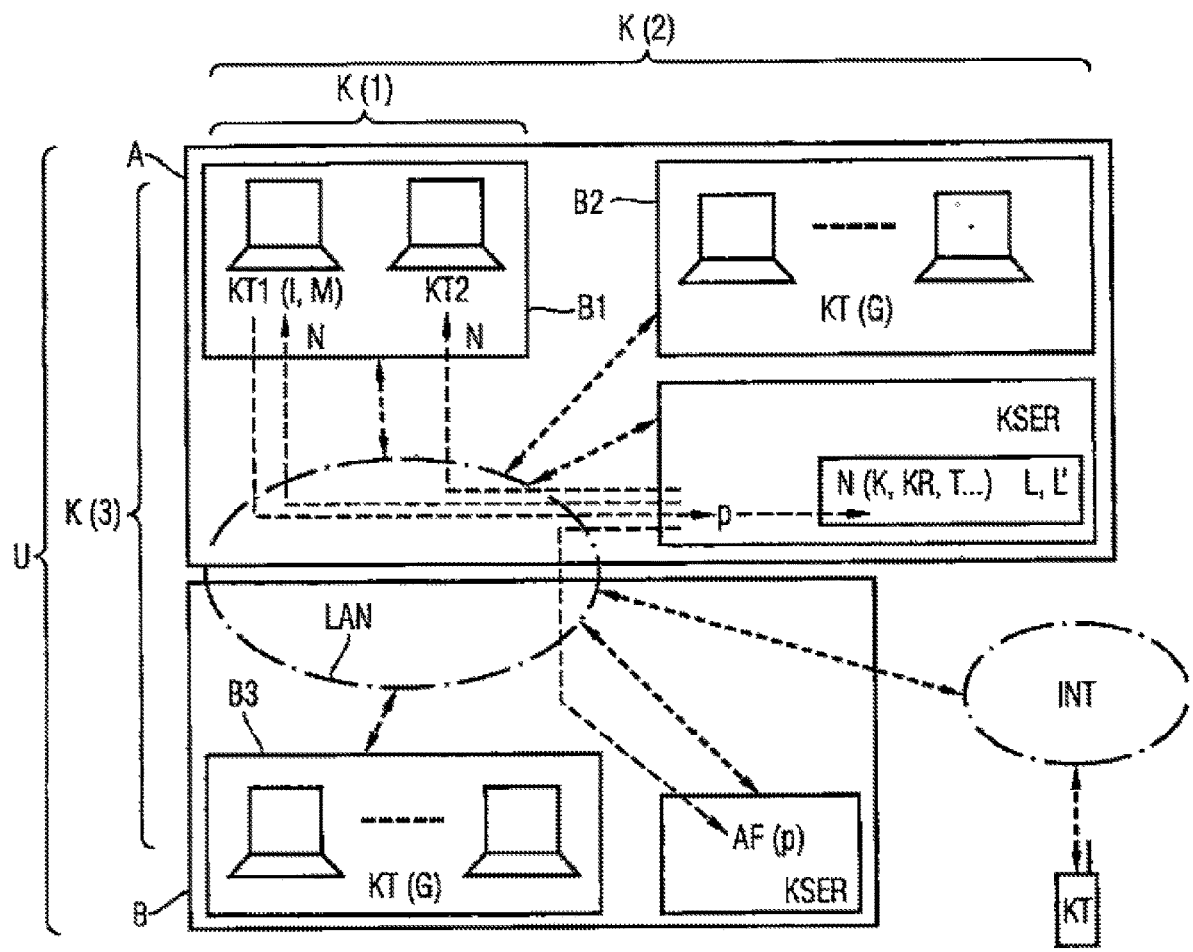

METHOD AND CONFERENCE SERVER FOR INITIALIZING SCHEDULED CONFERENCES

CROSS REFERENCE TO RELATED APPLICATIONS

This application is a continuation of U.S. patent application Ser. No. 14/947,207, which is a continuation of U.S. patent application Ser. No. 11/922,663, which is the US National Stage of International Application No. PCT/EP2006/063599, filed Jun. 27, 2006 and claims the benefit thereof. The International Application claims the benefits of German application No. 10 2005 030 597.0 DE filed Jun. 30, 2005. International Application No. PCT/EP2006/063599 and German application No. 10 2005 030 597.0 DE are incorporated by reference herein in their entirety.

FIELD OF INVENTION

The present invention relates to a method and conference server for initialization of scheduled conferences.

BACKGROUND OF INVENTION

The conference service feature is available in communication networks in addition to the usual service features such as call diversion or call answering. When a conference is convened, the individual conference participants are notified, by e-mail or by telephone for example, about the location of the conference or the conference area, the type of conference and the time. Enabling this type of information to be notified to the respective conference participants mostly requires comprehensive research into the current location of the respective conference participants and about the network and conference resources to be used.

If, in accordance with these notifications, five conference participants take part in a conference at three different locations or conference areas for example, the conference is mostly set up from one of the three locations, usually the location at which the conference participant initiating the conference is present, at the agreed time—for example a telephone conference or audiovisual conference. To this end the connections are established or switched through in the communication network—for example the telephone network—to the terminals or telephones at the further conference areas or locations at which the further conference participants are located or have been invited with the aid of conference equipment.

WO 2004/114662 A1 describes a conference system for setting up conference connections in which a person does not require any knowledge of the required systems if they wish to have a conference with a specific person. The person selects a person for the conference and the appropriate systems and the conference locations are selected with the aid of the conference system. The selection is made by using a priority list containing prioritized conference locations provided for each conference participant in-addition to other resource availabilities, system options and location of the person etc.

SUMMARY OF INVENTION

The underlying object of the invention consists of improving the convening of scheduled conferences, especially audio and audiovisual conferences. The object is achieved by the features the independent claims.

The essential aspect of the inventive method is to be seen in the selection of the conference participants and in the geographical location of the conference participants being determined with the aid of at least one communication network. Furthermore, depending on the location areas determined, the geographical conference areas for the respective conference participants are determined and these are communicated in addition to conference information.

The convening of conferences is made significantly easier with the aid of the inventive method since the location of the conference participant as well as the conference areas are determined automatically with the aid of elements in the network and the conference participants are then informed. This means a significant time saving in the convening of conferences and thereby a reduction in the outlay.

BRIEF DESCRIPTION OF THE DRAWINGS

Further advantageous embodiments of the invention are to be taken from the further claims and are explained in a following exemplary embodiment, with the exemplary embodiment being described with reference to a drawing, FIG. 1. FIG. 1 is a schematic view of an exemplary embodiment of a communication apparatus.

DETAILED DESCRIPTION OF INVENTION

It is assumed for the exemplary embodiment that an initiator I is provided for a conference K to be scheduled in an enterprise E, with the Initiator I of the conference K being identified as a first conference participant KT1 as well as moderator M of the conference. A further requirement is for the conference participants KT for a conference K to be able to be addressed via a URL address. The URL (Uniform Resource Locator) address is used for addressing in the Internet. The URL address consists of two parts, the determination of the protocol (http, https, ftp etc.) and the actual address (e.g. www.world.de). As a consequence the URL addresses of the conference participants KT are to be determined for a conference K. This can for example be done with the aid of a list L or table, in which the URL addresses are listed for the conference participants specified by name.

For the method as claimed in the invention a further list or a number of lists L' or tables are provided in which an assignment of the URL addresses to the sites and the localities or buildings B of a company U is specified. The conference areas or conference rooms KR which can be used in the individual buildings of the company B for the conference K are shown in this at least one further list L', with the occupancy times of the conference rooms KR being updated.

FIG. 1 shows an exemplary embodiment that includes a typical structure of a company U which comprises a site A with two buildings B1, B2 and a second site B with a third building B3. The two sites A, B are connected to each other for communication via a corporate network, especially a local area network LAN,—indicated additionally in the FIGURE by dotted double-ended arrows. For the control of the conferences K a conference server KSER is provided at each site A, B connected to the local network LAN. Stored in this server are the lists L, V described above. For the initialization of a conference K the initiator I of a conference K, depending on their location, communicates with one of the two conference servers KSER. To this end the parameters p of a conference K are transferred by the initiator I to one of the conference participants KSER at the conference server KSER.

For example the following parameters p can be suitable for a conference K to be scheduled:
Type of conference (K)
Conference identification
Start time
Conference duration
End time
Names of the conference participants KT
URL list of the conference participants KT
URL list of the conference resources (e.g. servers)

It is assumed in a first example that the initiator I of a conference to be convened K, who at the same time is the first conference participant KT1, wishes to initialize a conference K(1) with a second conference participant KT2. The Initiator I, as previously explained, enters the corresponding parameters p—for example with the names of the conference participants KT—at his terminal—especially a computer—and transfers this via the local area network LAN to the conference server KSER at the first location A—indicated by a dashed line with an arrowhead. In the conference server KSER the locations or the sites A,B of the two conference participants KT1 and KT2 are determined by a search being made in the available lists L, L" for an assignment of the entered URL address URL of the two conference participants KT1, KT2 and subsequently the location of the conference participants KT. For example in accordance with the lists L, L' the two conference participants are KT1, KT2 in the first building B1 of the first site A.

The reachability of the presence status of the conference participants KT can be determined by a presence function. In this case a presence module—mostly a presence server is interrogated with the aid of the conference server KSER and of the local network LAN, as to the connection the local area network LAN under which he is preferably accessible or is preferably located—not shown in the FIGURE. Also available in the presence server is information about the personal preferences of conference participants KT in respect of the conference resources such as conference area, i.e. conference rooms KR and conference server KSER or position in the organization. These can be included in the determination of the conference areas or conference resources, especially if conference participants KT can only participate some of the time or the conference area is not accessible in the available time.

After the determination of the location area of the two conference participants KT1, KT2 in the first building B1 a conference area or conference room KR can be determined with the aid of the lists L, L' and the information requested from the presence server. In the actual case the conference server KSER can determine that the conference K is taking place for just two conference participants KT1, KT2 in the office of the first conference participant KT1 or the Initiator I. Alternatively a non-occupied conference room KR in the first building B1 can also be provided for the conference K. In this case a conference calendar—not shown—is investigated as to whether a conference room is free in the first building B1 at the time of the conference and is subsequently booked. The conference calendar is to be managed appropriately for the company U, i.e. is to be updated.

After the conference area is determined, messages N are mapped in the conference server KSER which typically contain the following information:
Type of conference K
Participants in conference K
Conference area or conference room KR
Time T of the conference K including start time
Intended duration of the conference K
Moderator M of the conference
Initiator I of the conference Messages N formed in this way in the conference server KSER are transmitted via the local area network LAN to the two conference participants KT1, KT2 involved—shown in the FIGURE by dashed line with an arrowhead—and the time T is stored if necessary in a calendar of the terminals of the conference participants KT1, KT2 for a reminder before the beginning of the conference.

Shortly before a transmission of the message N to the two conference participants KT1, KT2 the reachability of the conference participants KT can likewise be determined through a presence function. In this case the current call processing status of a conference participant KT can be established, for example busy or free or call redirection set, as well as the networks and terminals via which the conference participants KT can be reached. This is advantageous since, if the message N cannot be transferred via the local area network LAN and another network, for example a mobile network INT has to be employed for the transmission of the message.

The respective conference participants KT can, where necessary, be sent navigation information indicating their conference area or conference room KR, with such information especially involving address information—but also very detailed information such as building of a company or floors in the buildings. The navigation information or address information is entered into a navigation system and with the aid of the navigation system the respective conference participant KT is directed to their respective conference area or conference room KR. This can be of interest both for navigation systems in motor vehicles but also for handhelds, with the aid of which a conference room KR is to be found in a building or company.

In a second example it is assumed, that additionally a group of conference participants KT(G) is to be included in a conference K (2). The conference K is initialized as described above at the conference server KSER responsible by transmission of the corresponding parameters p and with the aid of lists L, L', as already explained, it is established that the group of conference participants KT(G) is located in the second building B2 of the company U. If the group of conference participants KT(G) has more than two conference participants KT a conference area or a conference room KR in the second building B2 is sought, unless the preferences of individual conference participants KT, for example the Initiator I, give priority to another conference area. If a conference area or a conference room KR in the second building B2 is available at the intended time T of the conference K(2), this conference area or this conference room KR is determined and the conference participants KT involved are sent a corresponding message N about the conference type, time T, conference room KR, number of conference participants, moderator M and initiator I—not shown. Alternatively, if the conference area is not available in the second building B2 the conference area or the conference room KR in the first building BI can be determined and the conference participants KT involved can be notified through a corresponding message N.

In a third example it is assumed that the additional group of conference participants KT(G) which is to be included in a conference K(3) is located in a third building B3 in the second site B of the company U. By transmitting the parameter p of the conference K to be convened to the conference server KSER responsible at the first site A of the company U a conference K is initialized. In this case it is established in the conference server KSER with the aid of the lists L, L' that the first group of conference participants KT(G1) is not located at the first but at the second site B. To determine the location areas of the conference participants KT(G1) at the second location B a corresponding request AF including the parameters p of the conference K is transferred via the local area network LAN from the conference server KSER of the first site A to the conference server KSER of the second site B—indicated in the FIGURE by a dashed line with an arrowhead. The conference areas or the conference rooms KR for the Initiator I and the second conference participant KT2 at the first site A and the group of conference participants KT(G) at the second site B are determined with the aid of the two conference servers KSER. In this case the additional Information, which is available through the presence function or is interrogated by corresponding control of the presence function, is included in the determination of the conference areas. After an agreement or an exchange of information of the two conference servers KSER about the conference areas determined an identical message N is formed by the two conference servers KSER and transferred to the conference participant KT concerned at their respective site A, B. Since the conference participants KT are located at different sites A, B of the company U and for the conference K(3) two conference areas or conference rooms KR are provided at the two sites A,B, the corresponding conference resources such as conference server KSER and network capacities as well as the conference rooms KR including the conference terminals required for the conference K(3) are reserved or seized for the duration of the scheduled conference K. Furthermore with the aid of one of the two conference servers KSER, shortly before the time at which the conference K starts, a connection is initiated and set up automatically between conference terminals of the conference areas or the conference rooms KR of the two sites A, B.

Both audio and also audio-visual conferences can be initialized with the aid of the inventive method, i.e. the conference participants informed about the conference, the conference areas and conference resources, and set up at the intended time. The conferences currently set up can also be controlled in respect of changes to the connected conference participants or a change of moderator or switching of additional connections for the transmission of further information. In this case it should be noted for audio-visual conferences that the terminals are suitable or matched as regards protocols and compression methods and the network resources are suitable for a transmission of audiovisual information.

With the aid of the inventive method not only conferences in accordance with the corporate arrangements specified in the exemplary embodiments or distribution of the conference participants can be initialized, but conferences can also be initialized in which the conference participants are located in other or different corporate networks or also in the Internet or are subscribers to these networks, however an assignment of the conference participants to URL addresses and to conference areas and conference resources such as conference servers and network resources are to be provided. Otherwise the effort for determining the location area of the conference participants would increase significantly.

The invention claimed is:

1. A communication apparatus comprising:
a first conference server having a processor and non-transitory memory, the first conference server associated with a first site, the first conference server being communicatively connectable to a second conference server associated with a second site that is at a different geographical location than the first site;
the first conference server configured to receive a selection of conference participants for a conference, the conference participants comprising at least one first conference participant located in a first geographical location associated with the first site in a first geographical area and at least one second conference participant located in a second geographical location associated with the second site in a second geographical area;
the first conference server configured to determine a geographical location area for each of the at least one first conference participant and the at least one second conference participant;
the first conference server configured to determine whether a first conference resource in the determined geographical location area of the at least one first conference participant is available for use for the at least one first conference participant for the conference and assign the first conference resource to the conference between the at least one first conference participant and at least one second conference participant if the first conference resource is available;
the first conference server configured to send a notification message to the at least one first conference participant that identifies the first conference resource and provides scheduling information about the conference between the at least one first conference participant and the at least one second conference participant; and
the first conference server configured to communicate with the second conference server to determine conference resources in the first and second geographical areas for use by the conference participants based on the determined geographical location areas such that a notification message is sendable from the second conference server to the at least one second conference participant that identifies the second conference resource and provides scheduling information about the conference between the at least one first conference participant and the at least one second conference participant.

2. The communication apparatus of claim 1, comprising the second conference server.

3. The communication apparatus of claim 2, wherein the first and second conference resources are determined based on the communication network and which support a scheduled time for the establishment of the conference.

4. The communication apparatus of claim 1, wherein a Uniform Resource Locator (URL) address for each conference participant is available via at least one list accessible to the first conference server, the URL address identifying a geographical location assigned to that conference participant; and
wherein the geographical location areas are determined via the URL addresses and geographical locations are identified by the URL addresses.

5. The communication apparatus of claim 1, wherein the geographical location areas are determined for the respective conference participants based on geographical location assignment information.

6. The communication apparatus of claim 1, wherein the first conference resource is a conference room associated with the first site.

7. The communication apparatus of claim 1, wherein the first conference server is configured to determine whether the first conference resource is available for use for the at least one first conference participant for the conference by assessing at least one of:
- a preferred conference area of a preferred conference area of the at least one first conference participant,
- a preferred communication network of the at least one first conference participant,
- a preferred communication network of the at least one second conference participant,
- a preferred communication resource of the at least one first conference participant, and
- an additional application to be provided to the at least one first conference participant.

8. The communication apparatus of claim 7, wherein a terminal to which the at least one first conference participant is associated is determined by at least one presence server communicatively connected to the first conference server and is provided for the determination of the first geographical location area for the at least one first conference participant and the first conference resource.

9. The communication apparatus of claim 1, wherein the conference participants are selected individually depending on conference type and through a predetermined conference-type-specific group.

10. The communication apparatus of claim 1, further comprising:
- a navigation system configured to determine navigation information for the at least one first conference participant and configured to transmit the navigation information to guide the at least one first conference participant to the first conference resource.

11. The communication apparatus of claim 1, wherein the first conference resource is a server or a terminal that is configured to support at least one of initialization of a conference, setup of a conference, and control of a conference.

12. The communication apparatus of claim 11, comprising the second conference server, wherein the second conference resource is a server or a terminal that is configured to support at least one of initialization of a conference, setup of a conference, and control of a conference.

13. The communication apparatus of claim 1, wherein the conference is defined by parameters comprising at least one of conference type, conference identification start time, Uniform Resource Locator (URL) list of the conference participants, conference duration, end time, names of the conference participants and list of conference resources.

14. The communication apparatus of claim 1, wherein the notification message to be sent via the first conference server is configured to identify a type of conference, participants in conference, start time of the conference, intended duration of the conference, and the first conference resource, the first conference resource being a conference area or a conference room.

15. The communication apparatus of claim 1, wherein the first conference server is configured to interrogate at least one presence server to determine a reachability of each of the at least one first conference participant and the at least one second conference participant.

16. A method for initialization of a scheduled conference in a communication network, comprising:
- a first conference server receiving a selection of conference participants for a conference, the conference participants comprising at least one first conference participant located in a first geographical location associated with a first site in a first geographical area and at least one second conference participant located in a second geographical location associated with a second site in a second geographical area, the first conference server having a processor and non-transitory memory, the first conference server associated with the first site, the first conference server being communicatively connectable to a second conference server associated with the second site that is at a different geographical location than the first site;
- the first conference server determining a geographical location area for each of the at least one first conference participant and the at least one second conference participant;
- the first conference server determining whether a first conference resource in the determined geographical location area of the at least one first conference participant is available for use for the at least one first conference participant for the conference and assigning the first conference resource to the conference between the at least one first conference participant and at least one second conference participant if the first conference resource is available;
- the first conference server sending a notification message to the at least one first conference participant that identifies the first conference resource and provides scheduling information about the conference between the at least one first conference participant and the at least one second conference participant; and
- the first conference server communicating with the second conference server to determine conference resources in the first and second geographical areas for use by the conference participants based on the determined geographical location areas such that a notification message is sendable from the second conference server to the at least one second conference participant that identifies the second conference resource and provides scheduling information about the conference between the at least one first conference participant and the at least one second conference participant.

17. A non-transitory computer readable medium having code stored thereon that defines a method, the code being executable by a first conference server having a processor such that the first conference server performs the method, the first conference server associated with a first site, the first conference server being communicatively connectable to a second conference server associated with a second site that is at a different geographical location than the first site; the method comprising:
- the first conference server receiving a selection of conference participants for a conference, the conference participants comprising at least one first conference participant located in a first geographical location associated with the first site in a first geographical area and at least one second conference participant located in a second geographical location associated with the second site in a second geographical area;
- the first conference server determining a geographical location area for each of the at least one first conference participant and the at least one second conference participant;
- the first conference server determining whether a first conference resource in the determined geographical location area of the at least one first conference participant is available for use for the at least one first conference participant for the conference and assigning the first conference resource to the conference between the at least one first conference participant and at least one second conference participant if the first conference resource is available;

the first conference server sending a notification message to the at least one first conference participant that identifies the first conference resource and provides scheduling information about the conference between the at least one first conference participant and the at least one second conference participant; and the first conference server communicating with the second conference server to determine conference resources in the first and second geographical areas for use by the conference participants based on the determined geographical location areas such that a notification message is sendable from the second conference server to the at least one second conference participant that identifies the second conference resource and provides scheduling information about the conference between the at least one first conference participant and the at least one second conference participant.

* * * * *